(12) United States Patent
Goleski

(10) Patent No.: US 8,574,113 B1
(45) Date of Patent: Nov. 5, 2013

(54) MULTIPLE SPEED TRANSMISSION

(75) Inventor: Gregory Daniel Goleski, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/566,465

(22) Filed: Aug. 3, 2012

(51) Int. Cl.
*F16H 3/44* (2006.01)

(52) U.S. Cl.
USPC .......................................................... 475/282

(58) Field of Classification Search
USPC .................................. 475/271, 311, 317, 323
See application file for complete search history.

(56) References Cited

U.S. PATENT DOCUMENTS

| | | |
|---|---|---|
| 7,597,646 B2 | 10/2009 | Kamm et al. |
| 7,645,207 B2 | 1/2010 | Kamm et al. |
| 7,682,282 B2 | 3/2010 | Kamm et al. |
| 7,691,024 B2 | 4/2010 | Phillips et al. |
| 7,789,792 B2 | 9/2010 | Kamm et al. |
| 7,980,986 B2 | 7/2011 | Kamm et al. |
| 8,092,336 B2 | 1/2012 | Hart et al. |
| 8,157,697 B2 | 4/2012 | Hart et al. |
| 8,231,495 B2 | 7/2012 | Gumpoltsberger et al. |
| 8,303,455 B2 | 11/2012 | Gumpoltsberger et al. |
| 2010/0279814 A1* | 11/2010 | Brehmer et al. ............. 475/275 |
| 2011/0245013 A1 | 10/2011 | Kim |
| 2011/0294617 A1 | 12/2011 | Seo et al. |
| 2011/0300987 A1* | 12/2011 | Diosi et al. .................... 475/275 |
| 2011/0306460 A1* | 12/2011 | Haupt et al. .................. 475/275 |

OTHER PUBLICATIONS

H. Benford, M. Leising, The Lever Analogy: A New Tool in Transmission Analysis, 1982, Society of Automotive Engineers, Inc. 810102, p. 429-437.

* cited by examiner

*Primary Examiner* — David D Le
*Assistant Examiner* — David J Hlavka
(74) *Attorney, Agent, or Firm* — James Dottavio; Brooks Kushman P.C.

(57) ABSTRACT

A family of transmissions produces at least eight forward and one reverse speed ratio by selective engagement of various combinations of three clutches or brakes. Each transmission includes two fixed gearing arrangements that establish fixed speed relationships between an input shaft, and output shaft, and four other elements. Specifically, the input shaft is constrained to rotate at a speed between that of the first and second elements while the output shaft is constrained to rotate at a speed between that of the third and fourth elements. Additional gearing, clutches, and brakes establish specified selective speed relationships among these elements.

22 Claims, 4 Drawing Sheets

MULTIPLE SPEED TRANSMISSION

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements may be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to the housing may be called a brake. A group of elements are coupled if they are fixedly coupled or selectively coupled.

SUMMARY OF THE DISCLOSURE

A family of transmissions is disclosed. Each transmission includes an input shaft, an output shaft, a number of rotating elements, and gearing arrangements and clutches that impose specified fixed and selectable speed relationships.

In one embodiment, a transmission includes four simple planetary gear sets. The input shaft is fixedly coupled to the second planet carrier and selectively coupled to the fourth sun gear. The output shaft is fixedly coupled to the fourth planet carrier and coupled to the third planet carrier. The second sun gear is selectively coupled to the transmission case and coupled to the first sun gear. The first ring gear is coupled to the transmission case. The fourth ring gear is coupled to the first planet carrier and selectively coupled to the second ring gear. The second ring gear is coupled to the third sun gear and selectively coupled to the fourth sun gear. Finally, the third ring gear is coupled to the fourth sun gear.

In another embodiment, a transmission includes at least first, second, third, fourth, and fifth elements in addition to the input shaft and output shaft. A first gearing arrangement fixedly constrains the speed of the input shaft to be between the speeds of the first and second elements. The first gearing arrangement may be, for example, a simple planetary gear set having a sun gear as the second element, a planet carrier fixedly coupled to the input shaft, and a ring gear as the first element. A second gearing arrangement fixedly constrains the speed of the output shaft to be between the speeds of the third and fourth elements and fixedly constrains the speed of the fourth element to be between the speeds of the third and fifth elements. The second gearing arrangement may be, for example, an assembly having two simple planetary gear sets with interconnected elements. In this example, the third element is the combination of the first sun gear and the second ring gear which are fixedly coupled to one another, the output shaft is fixedly to the carriers which are fixedly coupled to one another, the fourth element is the first ring gear, and the fifth element is the second sun gear. A third gearing arrangement selectively constrains the speed of the fourth element to be between zero and the speed the second element. The third gearing arrangement may be, for example, a simple planetary gear set having a sun gear fixedly coupled to the second element, a planet carrier selectively coupled to the fourth element by a clutch, and a ring gear fixedly held against rotation. Eight speed embodiments have clutches and brakes which selectively hold the second element against rotation, selectively couple the third element to the input shaft, selectively couple the first element to the fifth element, and selectively couple the first element to the third element. Ten speed embodiments additionally have a clutch selectively coupling the first element to the fourth element.

In another embodiment, a transmission includes at least first, second, third, fourth, seventh, and eighth elements in addition to the input shaft and output shaft. A first gearing arrangement fixedly constrains the speed of the input shaft to be between the speeds of the first and second elements. The first gearing arrangement may be, for example, a simple planetary gear set having a sun gear as the second element, a planet carrier fixedly coupled to the input shaft, and a ring gear as the first element. A second gearing arrangement fixedly constrains the speed of the output shaft to be between the speeds of the third and fourth elements and fixedly constrains the speed of the fourth element to be between the speeds of the third and fifth elements. The second gearing arrangement may be, for example, a simple planetary gear set having a sun gear as the third element, a planet carrier fixedly coupled to the output shaft, and a ring gear as the fourth element. A third gearing arrangement fixedly constrains the speed of the output shaft to be between the speeds of the seventh element and the eighth element. The seventh element is coupled to the third element and the eighth element is coupled to the first element. The third gearing arrangement may be, for example, a simple planetary gear set having a sun gear as the eighth element fixedly coupled to the first element, a planet carrier fixedly coupled to the output shaft, and a ring gear as the seventh element selectively coupled to the third element. Alternatively, the fourth gearing arrangement may be, as another example, a simple planetary gear set having a sun gear as the eighth element selectively coupled to the first element, a planet carrier fixedly coupled to the output shaft, and a ring gear as the seventh element fixedly coupled to the third element. A fourth gearing arrangement selectively constrains the speed of the fourth element to be between zero and the speed the second element. The fourth gearing arrangement may be, for example, a simple planetary gear set having a sun gear fixedly coupled to the second element, a planet carrier selectively coupled to the fourth element, and a ring gear fixedly held against rotation. Alternatively, the fourth gearing arrangement may be, as another example, a simple planetary gear set having a sun gear fixedly coupled to the second element, a planet carrier fixedly coupled to the fourth element, and a ring gear selectively held against rotation. Clutches and brakes selectively hold the second element against rotation, selectively couple the third element to the input shaft, selectively couple the first element to the third element, and selectively couple the first element to the fourth element.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
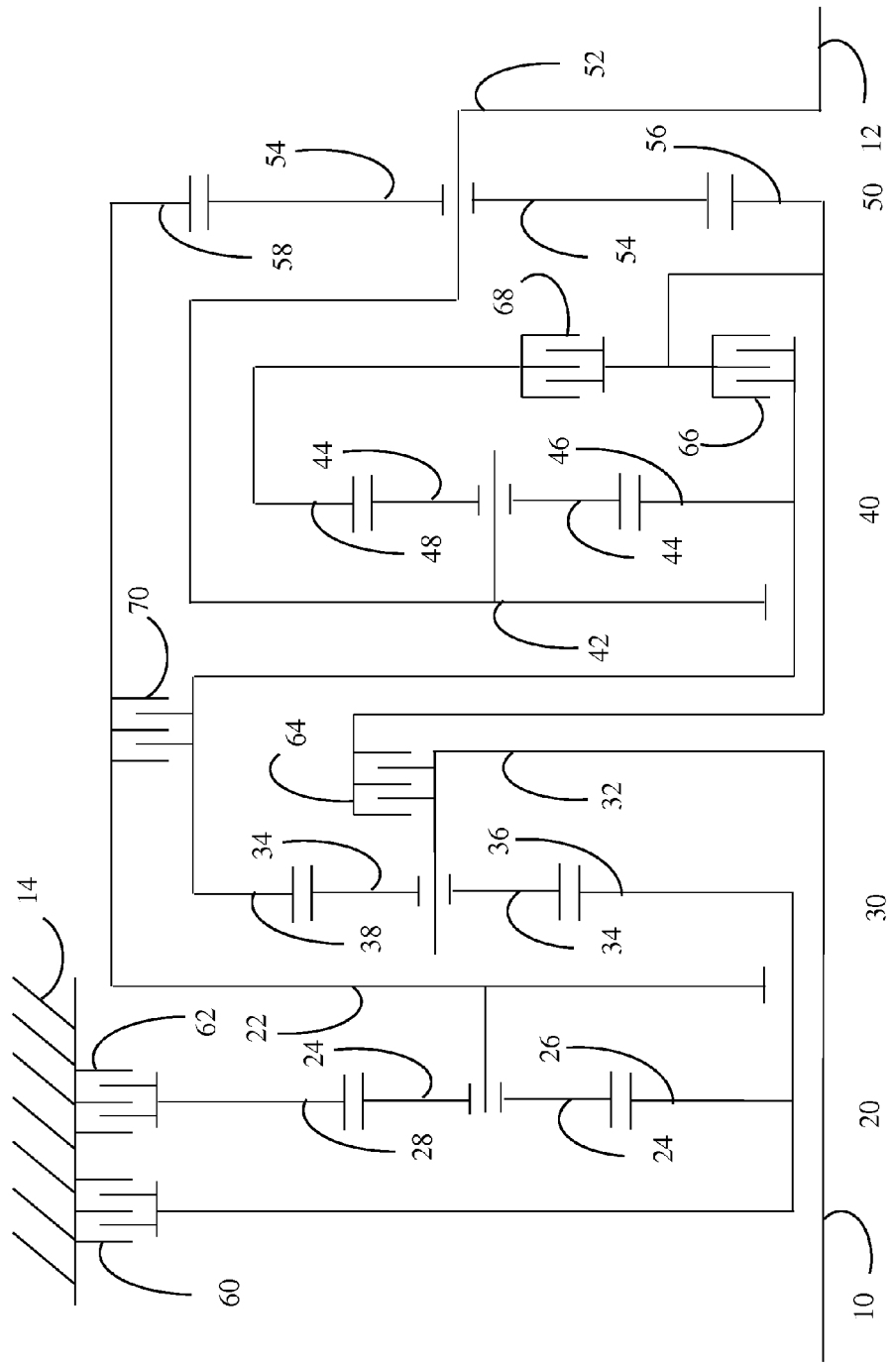
FIG. 1 is a schematic diagram of a first transmission gearing arrangement.

An example transmission is schematically illustrated in FIG. 1. The transmission utilizes four simple planetary gear sets 20, 30, 40, and 50. A simple planetary gear set is a type of fixed gearing arrangement. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. A simple planetary gear set imposes the fixed speed relationship that the speed of the carrier is between the speed of the sun gear and the speed of the ring gear. (This relationship is defined to include the condition in which all three rotate at the same speed.) More specifically, the speed of the carrier is a weighted average of the speed of the sun gear and the speed of the ring gear with weighting factors determined by the number of teeth on each gear. Similar speed relationships are imposed by other known types of fixed gearing arrangements. For example, a double pinion planetary gear set constrains the speed of the ring gear to be a weighted average between the speed of the sun gear and the speed of the carrier. A suggested ratio of gear teeth for each planetary gear set in FIG. 1 is listed in Table 1.

TABLE 1

| Ring 28/Sun 26 | 1.80 |
| Ring 38/Sun 36 | 1.71 |
| Ring 48/Sun 46 | 2.00 |
| Ring 58/Sun 56 | 3.70 |

Input shaft 10 is fixedly coupled to carrier 32. Output shaft 12 is fixedly coupled to carrier 42 and carrier 52. Carrier 22 is fixedly coupled to ring gear 58. Sun gear 26 is fixedly coupled to sun gear 36. Ring gear 38 is fixedly coupled to sun gear 46. Brake 60 selectively holds sun gear 26 and sun gear 36 against rotation. Brake 62 selectively holds ring gear 28 against rotation. Sun gear 56 is selectively coupled to input shaft 10 and carrier 32 by clutch 64, selectively coupled to sun gear 46 and ring gear 38 by clutch 66, and selectively coupled to ring gear 48 by clutch 68. Clutch 70 selectively couples ring gear 58 and carrier 22 to ring gear 38 and sun gear 46.

As shown in Table 2, engaging the clutches and brakes in combinations of three establishes ten forward speed ratios and one reverse speed ratio between input shaft 10 and output shaft 12. An X indicates that the clutch is engaged to establish the speed ratio. When the gear sets of FIG. 1 have tooth numbers as indicated in Table 1, the speed ratios have the values indicated in Table 2.

TABLE 2

|  | 60 | 62 | 64 | 66 | 68 | 70 | Ratio | Step |
|---|---|---|---|---|---|---|---|---|
| Rev |  | X | X |  | X |  | −4.04 | 86% |
| $1^{st}$ |  | X | X |  |  |  | 4.70 |  |
| $2^{nd}$ |  | X |  | X |  |  | 2.97 | 1.58 |
| $3^{rd}$ |  |  | X | X |  |  | 2.03 | 1.46 |
| $4^{th}$ |  |  |  | X |  | X | 1.66 | 1.22 |
| $5^{th}$ |  | X |  |  |  | X | 1.46 | 1.14 |
| $6^{th}$ |  | X |  |  | X |  | 1.26 | 1.16 |
| $7^{th}$ |  |  |  |  | X | X | 1.00 | 1.26 |
| $8^{th}$ | X |  |  |  | X |  | 0.84 | 1.19 |
| $9^{th}$ | X |  |  |  |  | X | 0.69 | 1.22 |
| $10^{th}$ | X |  |  |  | X | X | 0.63 | 1.09 |

All shifts between adjacent speed ratios can be accomplished by the coordinated release of one clutch or brake and the engagement of one other clutch or brake. Similar, all two step shifts except $4^{th}$ to $6^{th}$ and many of the three step shifts can be accomplished by the coordinated release of one friction element and engagement of one other friction element. Additional shift are possible by utilizing alternate combinations of clutches for certain speed ratios. Specifically, $4^{th}$ gear can be established by engaging brake 62 while engaging any two of clutches 66, 68, and 70. Similarly, $7^{th}$ gear can be established by engaging clutch 64 while engaging any two of clutches 66, 68, and 70 and $10^{th}$ gear can be established by engaging brake 60 while engaging any two of clutches 66, 68, and 70. For example, a shift from $4^{th}$ gear to $6^{th}$ gear can be accomplished by engaging clutch 68, then releasing clutch 66, and then coordinating the release of clutch 70 with the engagement of clutch 64.

Figure 2:
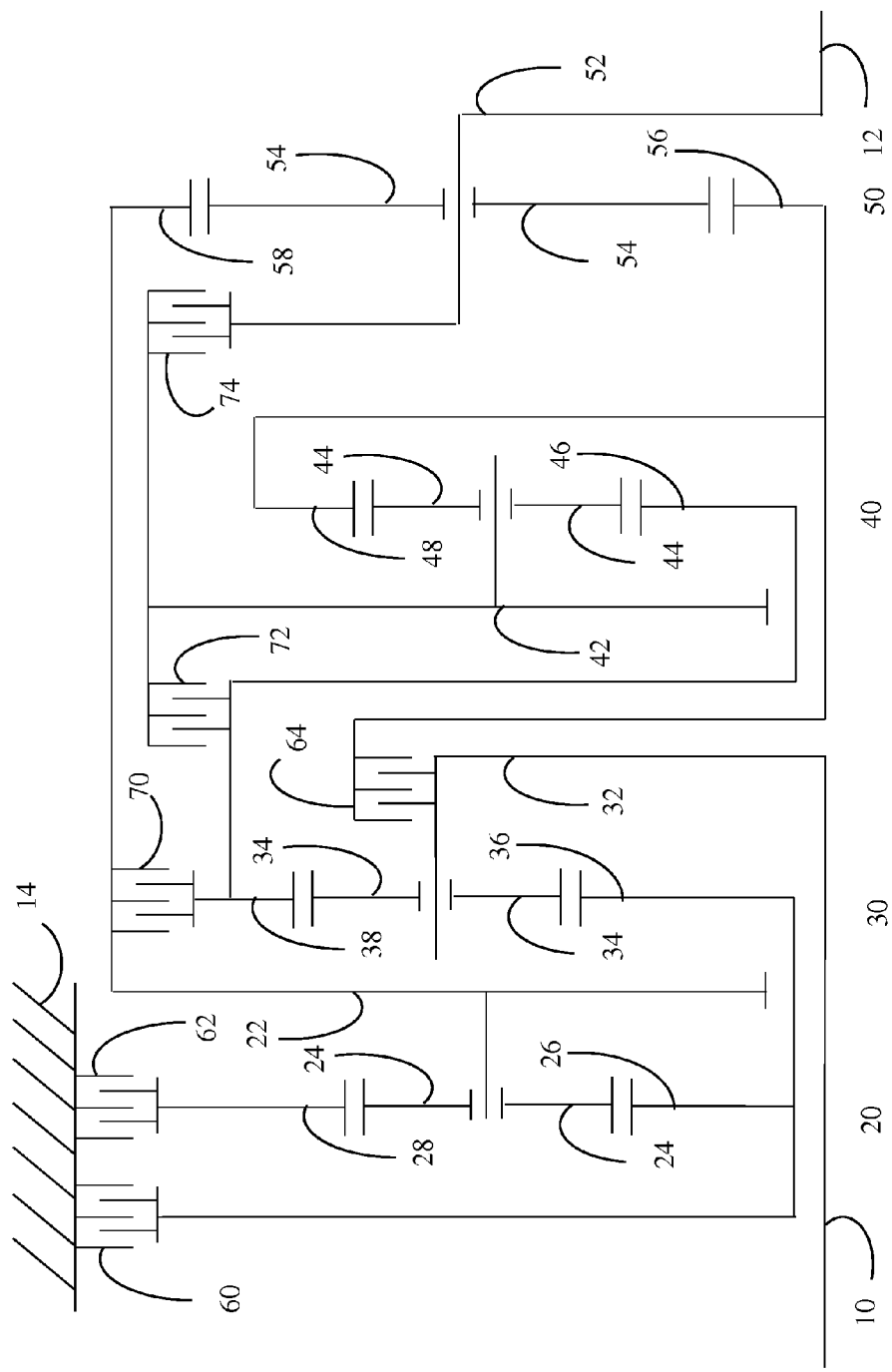
FIG. 2 is a schematic diagram of a second transmission gearing arrangement.

Another example transmission is illustrated in FIG. 2. The transmission utilizes four simple planetary gear sets 20, 30, 40, and 50. Input shaft 10 is fixedly coupled to carrier 32. Output shaft 12 is fixedly coupled to carrier 52. Carrier 22 is fixedly coupled to ring gear 58. Sun gear 26 is fixedly coupled to sun gear 36. Ring gear 38 is fixedly coupled to sun gear 46 and ring gear 48 is fixedly coupled to sun gear 56. Brake 60 selectively holds sun gear 26 and sun gear 36 against rotation. Brake 62 selectively holds ring gear 28 against rotation. Clutch 68 selectively couples ring gear 48 and sun gear 56 to input shaft 10 and carrier 32. Ring gear 38 and sun gear 46 are selectively coupled to carrier 22 and ring gear 58 by clutch 70 and selectively coupled to carrier 42 by clutch 72. Clutch 74 selectively couples carrier 42 to carrier 52 and output shaft 12.

Although clutch 72 does not directly couple ring gear 38 to sun gear 56, clutch 72 operatively couples ring gear 38 to sun gear 56. When clutch 72 is engaged, sun gear 46, carrier 42, and ring gear 48 are forced to rotate as a unit. Since ring gear 38 is fixedly coupled to sun gear 46 and sun gear 56 is fixedly coupled to ring gear 48, ring gear 38 and sun gear 46 are forced to rotate at the same speed when clutch 72 is engaged.

As shown in Table 2, engaging the clutches and brakes in combinations of three establishes ten forward speed ratios and one reverse speed ratio between input shaft 10 and output shaft 12. When the gear sets of FIG. 2 have tooth numbers as indicated in Table 1, the speed ratios have the values indicated in Table 3.

TABLE 3

|  | 60 | 62 | 64 | 70 | 72 | 74 | Ratio | Step |
|---|---|---|---|---|---|---|---|---|
| Rev | X | X |  |  |  | X | −4.04 | 86% |
| 1st | X | X | X |  |  |  | 4.70 |  |
| 2nd | X | X |  |  | X |  | 2.97 | 1.58 |
| 3rd |  | X | X |  | X |  | 2.03 | 1.46 |
| 4th |  | X |  | X | X |  | 1.66 | 1.22 |
| 5th |  | X | X | X |  |  | 1.46 | 1.14 |
| 6th |  | X | X |  |  | X | 1.26 | 1.16 |
| 7th |  |  | X | X |  | X | 1.00 | 1.26 |
| 8th | X |  | X |  |  | X | 0.84 | 1.19 |
| 9th | X |  | X | X |  |  | 0.69 | 1.22 |
| 10th | X |  |  | X |  | X | 0.63 | 1.09 |

Figure 3:
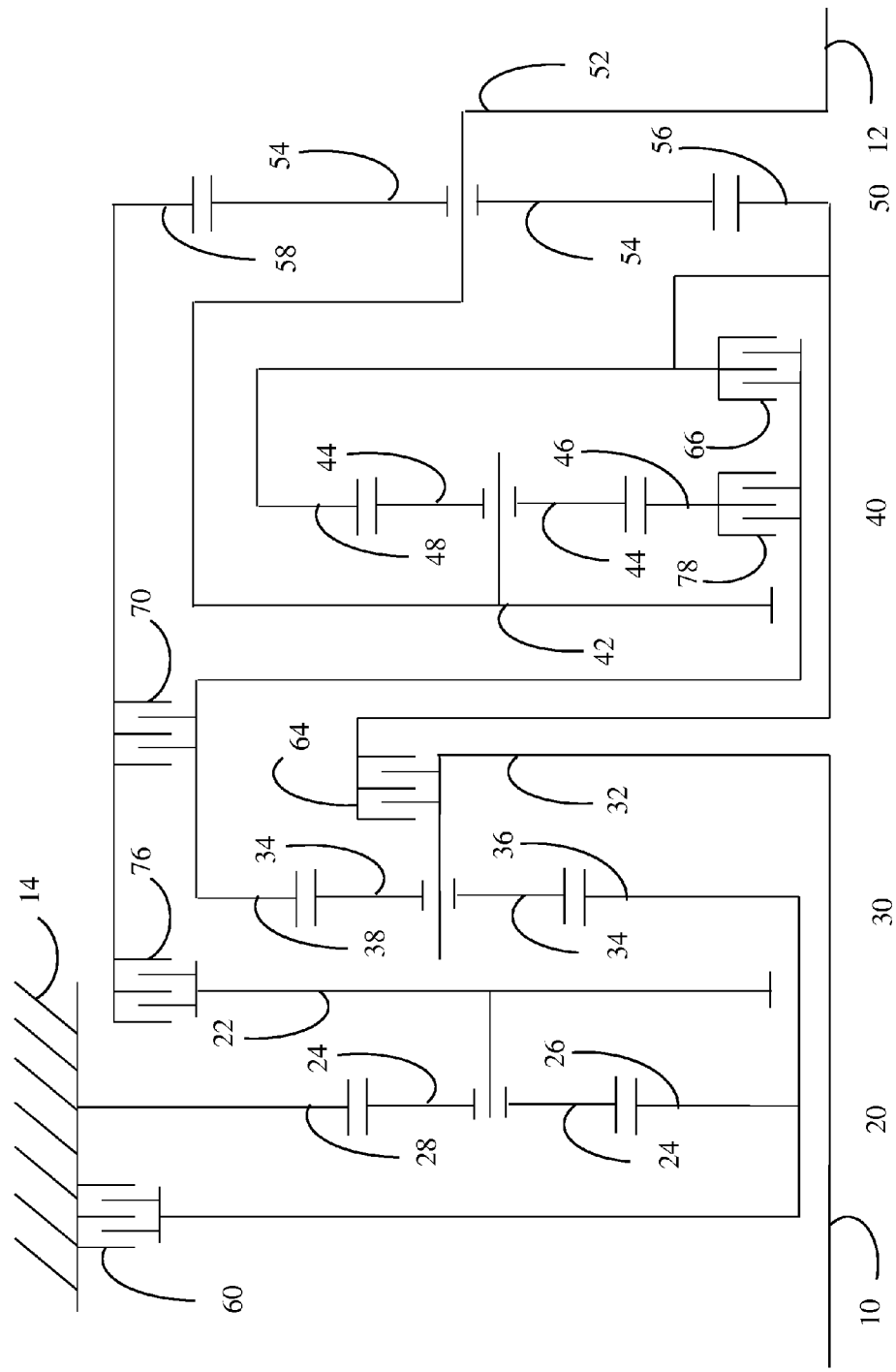
FIG. 3 is a schematic diagram of a third transmission gearing arrangement.

A third example transmission is illustrated in FIG. 3. The transmission utilizes four simple planetary gear sets 20, 30, 40, and 50. Input shaft 10 is fixedly coupled to carrier 32. Output shaft 12 is fixedly coupled to carrier 42 and carrier 52. Ring gear 28 is fixedly held against rotation by transmission case 14. Sun gear 26 is fixedly coupled to sun gear 36. Ring gear 48 is fixedly coupled to sun gear 56. Brake 60 selectively holds sun gear 26 and sun gear 36 against rotation. Ring gear 58 is selectively coupled to ring gear 38 and sun gear 46 by clutch 70 and selectively coupled to carrier 22 by clutch 76. Clutch 64 selectively couples input shaft 10 to sun gear 56. Ring gear 38 is selectively coupled to ring gear 48 and sun gear 56 by clutch 66 and selectively coupled to sun gear 46 by clutch 78.

As shown in Table 2, engaging the clutches and brakes in combinations of three establishes ten forward speed ratios and one reverse speed ratio between input shaft 10 and output shaft 12. When the gear sets of FIG. 3 have tooth numbers as indicated in Table 1, the speed ratios have the values indicated in Table 4.

TABLE 4

|  | 60 | 64 | 66 | 70 | 76 | 78 | Ratio | Step |
|---|---|---|---|---|---|---|---|---|
| Rev |  | X |  |  | X | X | −4.04 | 86% |
| 1st | X | X |  |  | X |  | 4.70 |  |
| 2nd | X |  | X |  | X |  | 2.97 | 1.58 |
| 3rd |  | X | X |  | X |  | 2.03 | 1.46 |
| 4th |  |  | X | X | X |  | 1.66 | 1.22 |
| 5th |  | X |  | X | X |  | 1.46 | 1.14 |
| 6th |  | X |  |  | X | X | 1.26 | 1.16 |
| 7th |  | X |  | X |  | X | 1.00 | 1.26 |
| 8th | X | X |  |  |  | X | 0.84 | 1.19 |
| 9th | X | X |  | X |  |  | 0.69 | 1.22 |
| 10th | X |  |  | X |  | X | 0.63 | 1.09 |

Figure 4:
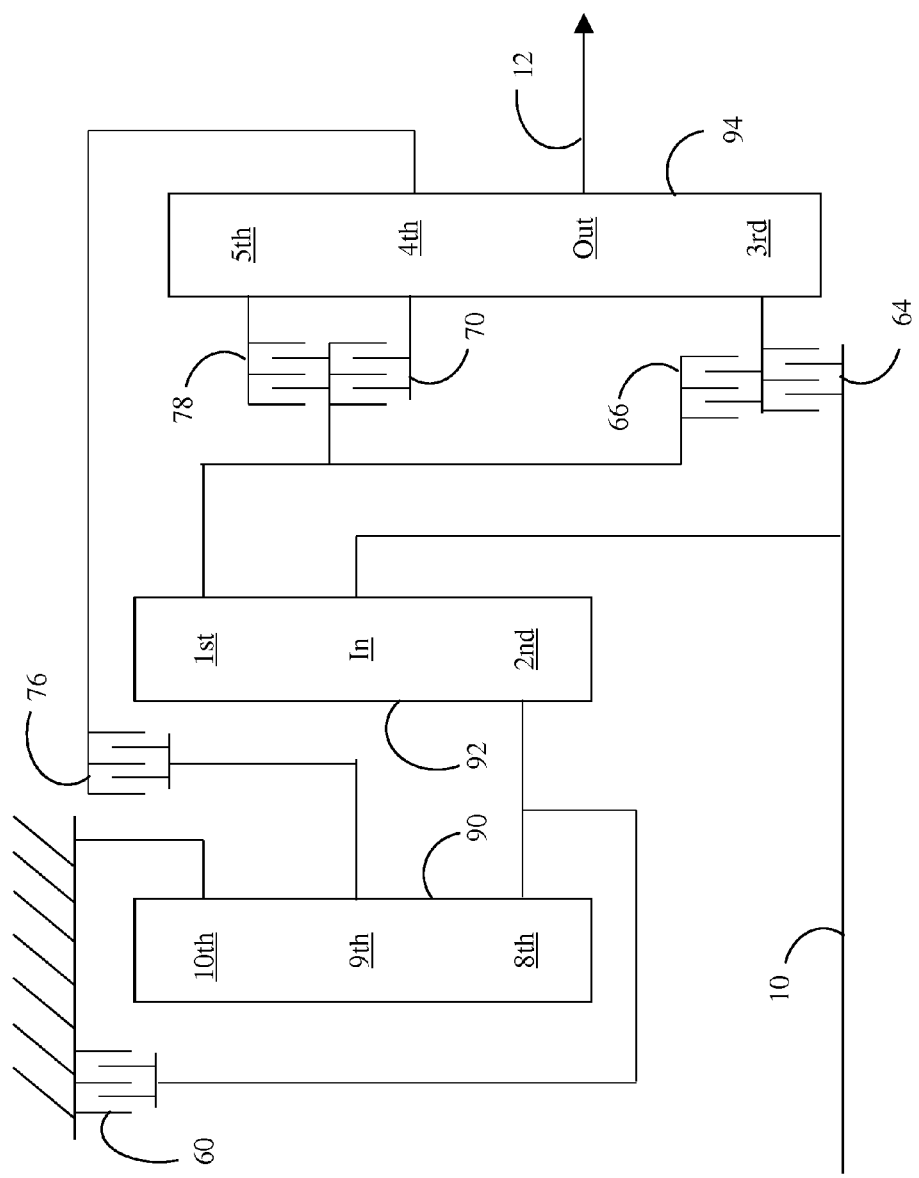
FIG. 4 is a lever diagram corresponding to the gearing arrangement of FIG. 3.

FIG. 4 describes the transmissions of FIG. 3 in the form of a lever diagram. Gear elements which rotate about a common axis and have speeds with a fixed linear relationship are shown along a lever according to their relative speeds. The two elements that have the most extreme speeds are shown at the endpoints of the lever. The remaining elements are shown at intermediate points according to the weighting factors. Lever 90 corresponds to gear set 20 with sun gear 26 as the 8th element, carrier 22 as the 9th element, and ring gear 28 as the 10th element. Similarly, lever 92 corresponds to gear set 30 with sun gear 36 as the 2nd element and ring gear 38 as the 1st element. Finally, lever 94 corresponds to gear sets 40 and 50, with the 3rd element corresponding to ring gear 48 and sun gear 56, the 4th element corresponding to ring gear 58, and the 5th element corresponding to sun gear 46. Any four element fixed gearing arrangement that imposes the designated speed relationships with appropriate weighting factors may be substituted for gear sets 40 and 50 of FIG. 3 without impacting the transmission speed ratios. Any combination of two planetary gear sets with two elements of each fixedly connected to two elements of the other forms a four element fixed gearing arrangement. Some fixed gearing arrangements will be preferable to others in terms of packaging, efficiency, and planet gear speeds.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:
1. A transmission comprising:
an input shaft;
an output shaft;
a transmission case; and first, second, third, and fourth simple planetary gear sets, each simple planetary gear set having a sun gear, a planet carrier, a ring gear, and a plurality of planet gears supported for rotation relative to the planet carrier and in continuous meshing engagement with both the sun gear and the ring gear wherein the input shaft is fixedly coupled to the second planet carrier and selectively coupled to the fourth sun gear;

the output shaft is fixedly coupled to the fourth planet carrier and coupled to the third planet carrier;

the second sun gear is selectively coupled to the transmission case and coupled to the first sun gear;

the first ring gear is coupled to the transmission case;

the fourth ring gear is coupled to the first planet carrier and selectively directly coupled to the second ring gear;

the second ring gear is coupled to the third sun gear and selectively coupled to the fourth sun gear; and the third ring gear is coupled to the fourth sun gear.

2. The transmission of claim 1 wherein:
the first sun gear is fixedly coupled to the second sun gear;
the first planet carrier is fixedly coupled to the fourth ring gear; and
the first ring gear is selectively coupled to the transmission case.

3. The transmission of claim 1 wherein:
the first sun gear is fixedly coupled to the second sun gear;
the first planet carrier is selectively coupled to the fourth ring gear; and
the first ring gear is fixedly coupled to the transmission case.

4. The transmission of claim 1 wherein:
the third sun gear is fixedly coupled to the second ring gear;
the third planet carrier is fixedly coupled to the output shaft; and
the third ring gear is selectively coupled to the fourth sun gear.

5. The transmission of claim 1 wherein:
the third sun gear is fixedly coupled to the second ring gear;
the third planet carrier is selectively coupled to the output shaft; and
the third ring gear is fixedly coupled to the fourth sun gear.

6. The transmission of claim 1 wherein:
the third sun gear is selectively coupled to the second ring gear;
the third planet carrier is fixedly coupled to the output shaft; and
the third ring gear is fixedly coupled to the fourth sun gear.

7. The transmission of claim 1 wherein the second ring gear is selectively directly coupled to the fourth sun gear.

8. The transmission of claim 1 wherein:
the second ring gear is fixedly coupled to the third sun gear;
the third ring gear is fixedly coupled to the fourth sun gear; and
a clutch selectively directly couples the third planet carrier to one of the third sun gear and the third ring gear.

9. A transmission comprising:
an input shaft;
an output shaft;
a first fixed gearing arrangement configured to fixedly constrain the input shaft to rotate at a speed between speeds of a first element and a second element;
a second fixed gearing arrangement configured to fixedly constrain the output shaft to rotate at a speed between speeds of a third element and a fourth element and fixedly constrain the fourth element to rotate at a speed between speeds of the third element and a fifth element;
a first shiftable gearing arrangement configured to selectively constrain the fourth element to rotate at a speed between zero and a speed of the second element; and
a first clutch selectively coupling the first element to the fourth element.

10. The transmission of claim 9 further comprising:
a first brake selectively holding the second element against rotation;
a second clutch selectively coupling the third element to the input shaft;
a third clutch selectively coupling the first element to the fifth element; and
a fourth clutch selectively coupling the first element to the third element.

11. The transmission of claim 9 wherein the first fixed gearing arrangement comprises a simple planetary gear set having a sun gear as the second element, a planet carrier fixedly coupled to the input shaft, a ring gear as the first element, and a plurality of planet gears supported for rotation relative to the planet carrier and in continuous meshing engagement with both the sun gear and the ring gear.

12. The transmission of claim 9 wherein the second fixed gearing arrangement comprises:
a first simple planetary gear set having a first sun gear as the third element, a first planet carrier fixedly coupled to the output shaft, a first ring gear as the fourth element, and a first plurality of planet gears supported for rotation relative to the first planet carrier and in continuous meshing engagement with both the first sun gear and the first ring gear; and
a second simple planetary gear set having a second sun gear as the fifth element, a second planet carrier fixedly coupled to the output shaft, a second ring gear fixedly coupled to the first sun gear, and a second plurality of planet gears supported for rotation relative to the second planet carrier and in continuous meshing engagement with both the second sun gear and the second ring gear.

13. The transmission of claim 9 wherein the first shiftable gearing arrangement comprises:
a simple planetary gear set having a sun gear fixedly coupled to the second element, a planet carrier, a ring gear fixedly held against rotation, and a plurality of planet gears supported for rotation relative to the planet carrier and in continuous meshing engagement with both the sun gear and the ring gear; and
a fifth clutch selectively coupling the planet carrier to the fourth element.

14. A transmission comprising:
an input shaft;
an output shaft;
a first fixed gearing arrangement configured to fixedly constrain the input shaft to rotate at a speed between speeds of a first element and a second element;
a second fixed gearing arrangement configured to fixedly constrain the output shaft to rotate at a speed between speeds of a third element and a fourth element;
a third fixed gearing arrangement configured to fixedly constrain the output shaft to rotate at a speed between speeds of a seventh element and an eighth element, wherein the seventh element is coupled to the third element and the eighth element is coupled to the first element;
a first shiftable gearing arrangement configured to selectively constrain the fourth element to rotate at a speed between zero and a speed of the second element; and
a first clutch selectively directly coupling the first element to the fourth element.

15. The transmission of claim 14 further comprising:
a first brake selectively holding the second element against rotation;
a second clutch selectively coupling the third element to the input shaft; and
a third clutch selectively coupling the first element to the third element.

16. The transmission of claim 14 wherein the first fixed gearing arrangement comprises a simple planetary gear set having a sun gear as the second element, a planet carrier fixedly coupled to the input shaft, a ring gear as the first element, and a plurality of planet gears supported for rotation relative to the planet carrier and in continuous meshing engagement with both the sun gear and the ring gear.

17. The transmission of claim 14 wherein the second fixed gearing arrangement comprises a simple planetary gear set having a sun gear as the third element, a planet carrier fixedly coupled to the output shaft, a ring gear as the fourth element, and a plurality of planet gears supported for rotation relative to the planet carrier and in continuous meshing engagement with both the sun gear and the ring gear.

18. The transmission of claim 14 wherein the third fixed gearing arrangement comprises a simple planetary gear set having a sun gear as the eighth element, a planet carrier fixedly coupled to the output shaft, a ring gear as the seventh element, and a plurality of planet gears supported for rotation relative to the planet carrier and in continuous meshing engagement with both the sun gear and the ring gear.

19. The transmission of claim 18 wherein:
the sun gear is fixedly coupled to the first element; and
a fourth clutch selectively couples the ring gear to the third element.

20. The transmission of claim 18 wherein:
the ring gear is fixedly coupled to the third element; and
a fourth clutch selectively couples the sun gear to the first element.

21. The transmission of claim 14 wherein the first shiftable gearing arrangement comprises:
a simple planetary gear set having a sun gear fixedly coupled to the second element, a planet carrier fixedly coupled to the third element, a ring gear, and a plurality of planet gears supported for rotation relative to the planet carrier and in continuous meshing engagement with both the sun gear and the ring gear; and
a second brake selectively holding the ring gear against rotation.

22. The transmission of claim 14 wherein the first shiftable gearing arrangement comprises:
a simple planetary gear set having a sun gear fixedly coupled to the second element, a planet carrier, a ring gear fixedly held against rotation, and a plurality of planet gears supported for rotation relative to the planet carrier and in continuous meshing engagement with both the sun gear and the ring gear; and
a fourth clutch selectively coupling the planet carrier to the third element.

* * * * *